(12) United States Patent
Ing et al.

(10) Patent No.: US 11,579,582 B2
(45) Date of Patent: Feb. 14, 2023

(54) METHODS AND SYSTEMS FOR WIRE ELECTRIC DISCHARGE MACHINING AND VALIDATION OF PARTS

(71) Applicant: PRATT & WHITNEY CANADA CORP., Longueuil (CA)

(72) Inventors: Visal Ing, Sainte-Julie (CA); Michel Frederick, Candiac (CA); Ghislain Hardy, Sainte-Julie (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 714 days.

(21) Appl. No.: 16/585,606

(22) Filed: Sep. 27, 2019

(65) Prior Publication Data
US 2021/0096527 A1    Apr. 1, 2021

(51) Int. Cl.
| G05B 19/18 | (2006.01) |
| B23H 7/02 | (2006.01) |
| B23H 11/00 | (2006.01) |
| B23H 9/10 | (2006.01) |

(52) U.S. Cl.
CPC ............. *G05B 19/182* (2013.01); *B23H 7/02* (2013.01); *B23H 9/10* (2013.01); *B23H 11/00* (2013.01); *G05B 2219/45043* (2013.01)

(58) Field of Classification Search
CPC . B23H 7/02; B23H 9/10; B23H 11/00; G05B 2219/45043; F05D 2230/12
See application file for complete search history.

(56) References Cited

U.S. PATENT DOCUMENTS

| 4,571,477 A | 2/1986 | Weber |
| 4,960,971 A * | 10/1990 | Kawanabe ........... B23H 11/003 |
| | | 219/69.12 |
| 5,685,060 A * | 11/1997 | Tibbet ....................... B23Q 3/06 |
| | | 29/559 |
| 7,007,382 B2 | 3/2006 | Mantel |
| 9,170,182 B2 | 10/2015 | Gibson et al. |
| 2010/0025379 A1 | 2/2010 | Ben Salah et al. |
| 2010/0325852 A1 | 12/2010 | Frederick |
| 2014/0257542 A1 | 9/2014 | Li et al. |
| 2015/0047168 A1 | 2/2015 | James |
| 2015/0127136 A1 | 5/2015 | Abe |

(Continued)

FOREIGN PATENT DOCUMENTS

| JP | 60034219 | 2/1985 |
| JP | 03121722 | 5/1991 |

(Continued)

OTHER PUBLICATIONS

Machine translation of Japan Patent No. 11114725A, Jun. 2022 (Year: 2022).*

*Primary Examiner* — Geoffrey S Evans
(74) *Attorney, Agent, or Firm* — Norton Rose Fulbright Canada LLP

(57) ABSTRACT

A tool for validating a wire-electric-discharge-machining (wEDM) operation to be performed using a wEDM machine comprises a body including an engagement feature shaped to removably hold a validation coupon to be machined in the wEDM operation, the validation coupon sized larger than a size of a cut-out to be made in a part using the wEDM machine. A method of manufacturing the tool and a wEDM machine assembly are also provided.

19 Claims, 10 Drawing Sheets

(56) References Cited

U.S. PATENT DOCUMENTS

| | | |
|---|---|---|
| 2015/0267540 A1 | 9/2015 | Grilli et al. |
| 2016/0059369 A1 | 3/2016 | Minotti et al. |
| 2016/0067836 A1 | 3/2016 | Huxol et al. |
| 2017/0151618 A1 | 6/2017 | Shirai |
| 2017/0341172 A1 | 11/2017 | Oonishi et al. |
| 2018/0257189 A1 | 9/2018 | Johnson et al. |
| 2021/0094110 A1* | 4/2021 | Ing ............................ B23H 9/10 |

FOREIGN PATENT DOCUMENTS

| | | | |
|---|---|---|---|
| JP | 11114725 A | * | 4/1999 |
| JP | 2010120117 | | 6/2010 |

* cited by examiner

50A

52A — Manufacture a body including an engagement feature shaped to removably engage a securement assembly of a wEDM machine to secure the body to the securement assembly of the wEDM machine instead of a part to be machined by the wEDM machine.

54A — Manufacture a fastener assembly connected to the body, the fastener assembly operable to removably secure a validation coupon to the body, the validation coupon being larger than the cut-out but smaller than the part to be machined.

56A — Dimension the body and the fastener assembly of the tool to:

a) position the validation coupon in the given location when the fastener assembly removably receives and secures therein the validation coupon and the body of the tool is removably engaged to the securement assembly of the wEDM machine instead of the part to be machined, and b) orient the validation coupon relative to the wEDM machine by removably engaging the tool to the securement assembly of the wEDM machine to permit a wEDM machining assembly of the wEDM machine to machine the cut-out in the validation coupon.

Fig-5A

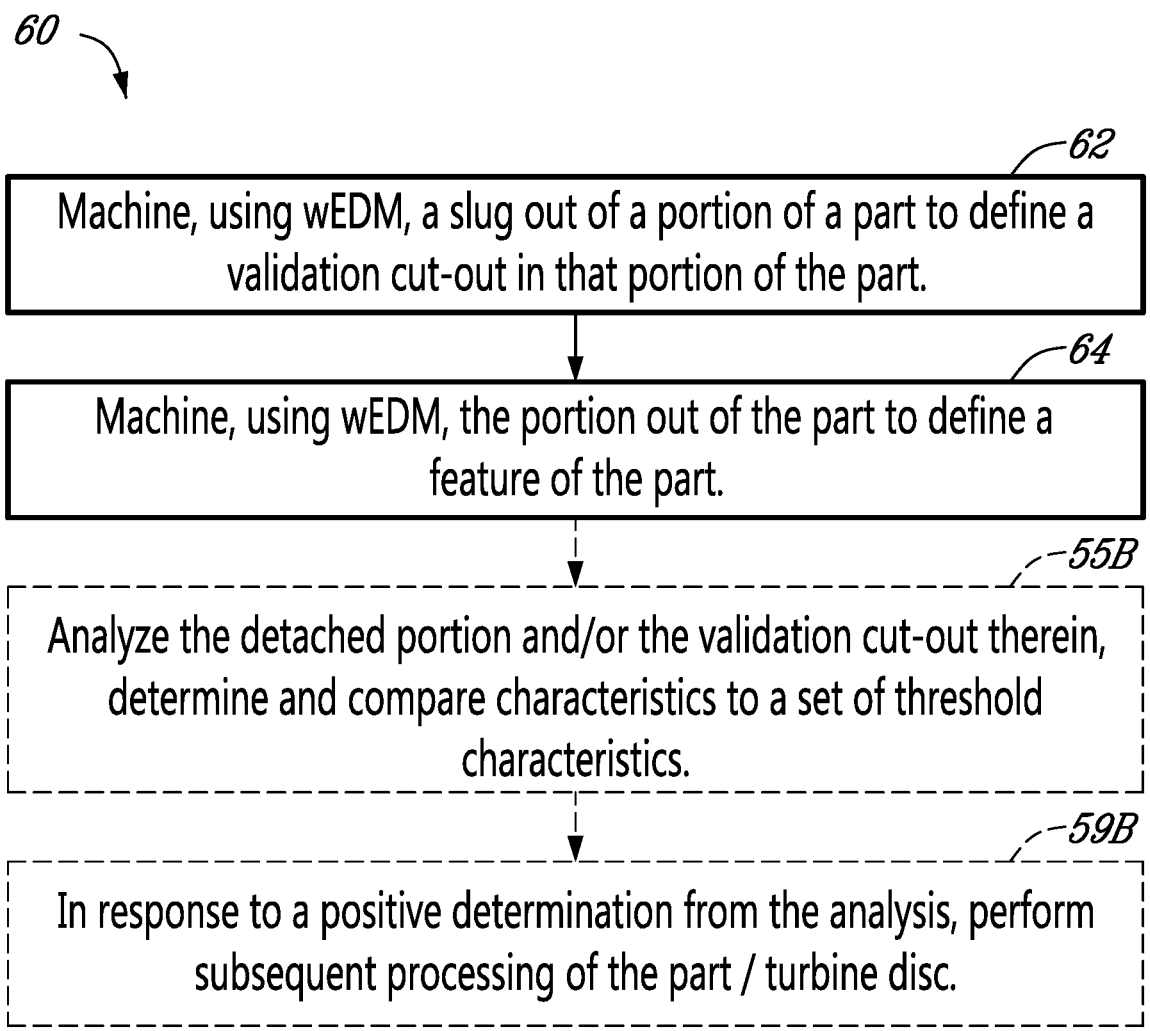

70

72 — Execute, using a wEDM machine having a turbine disc removably engaged thereto for wEDM, a wEDM roughing pass to define a fir-tree shaped validation cut-out in the turbine disc in a given location of a given slot to be machined in the turbine disc using the wEDM machine, the validation cut-out having a validation surface.

74 — Execute, using the wEDM machine, at least one additional wEDM pass along the validation surface to give the validation surface a surface finish to which the given slot in the turbine disc is to be machined.

76 — Machine, using the wEDM, slots in the turbine disc in respective ones of given locations of the slots, the slots including the given slot, by executing respective iterations of the roughing pass with respect to the slots, the step of wEDM the slots removing from the turbine disc a portion of the turbine disc having the validation cut-out.

78 — Execute, using the wEDM, respective iterations of the at least one additional pass along surfaces of the turbine disc defining the slots to give the surfaces of the turbine disc the surface finish.

Fig-7

METHODS AND SYSTEMS FOR WIRE ELECTRIC DISCHARGE MACHINING AND VALIDATION OF PARTS

TECHNICAL FIELD

The application relates generally to methods and systems for wire electric discharge machining and validation of parts.

BACKGROUND

Prior art methods of wire electric discharge machining (wEDM) cut-outs in parts are known and suitable for their intended purposes. In some applications, such as aerospace applications, in which wEDM may be used usually involve machining relatively expensive parts and labour. Hence, improvements to existing wEDM methods are desirable, especially in the aerospace industry, as even seemingly small improvements may provide for material advantages such as materials, cost and time savings for example.

SUMMARY

In one aspect, there is provided a tool for validating a wire-electric-discharge-machining (wEDM) operation to be performed using a wEDM machine, a body including an engagement feature shaped to removably hold a validation coupon to be machined in the wEDM operation, the validation coupon sized larger than a size of a cut-out to be made in a part using the wEDM machine.

In some embodiments, the engagement feature includes: a block defining in the block a cavity shaped to receive the validation coupon, and a fastener connected to the block and movable between: an open position in which the validation coupon is movable in and out of the cavity, and a closed position in which the fastener secures the validation coupon in the cavity.

In some embodiments, the fastener is a plurality of fasteners.

In some embodiments, the plurality of fasteners includes at least two fasteners disposed on opposite sides of the cavity and movable into the cavity toward each other when moved from their respective open positions toward their respective closed positions.

In some embodiments, the block is one of integral with and attached to the body.

In some embodiments, the engagement feature is an aperture extending through the body.

In some embodiments, a validation kit may be provided comprising the part and the tool as described in any of the embodiments above, wherein the part has an outer profile having a thickness and a diameter, and the body and the engagement feature of the tool together define an outer profile of the tool that at least in part matches the outer profile of the part.

In some such validation kits, the part includes an aperture having a diameter and a rotation axis that defines the diameter of the outer profile of the part, and the engagement feature of the tool is an aperture having the diameter of the aperture in the part.

In some such validation kits, the cut-out is to be made in a given location in the part when the part is removably engaged to the securement assembly of the wEDM machine, the given location relative to the wEDM machine.

In some such validation kits, the body and the engagement feature of the tool are dimensioned relative to the part such that when the engagement feature removably receives and secures therein the validation coupon and the body of the tool is secured via the engagement feature to the securement assembly of the wEDM machine instead of the part, the validation coupon is in the given location and is oriented relative to the wEDM machine to permit the wEDM machine to machine the cut-out in the validation coupon.

In another aspect there is provided a wire-electric-discharge-machining (wEDM) machine assembly, comprising: a wEDM machine that includes a securement assembly configured to removably engage a part to be machined to the wEDM machine and a wEDM machining assembly configured to machine the part using a wEDM process, including machining a cut-out in a given location in the part, the given location relative to the wEDM machine; and a tool that includes: a body including an engagement feature shaped to removably engage the body to the securement assembly of the wEDM machine, and a fastener assembly operable to removably secure a validation coupon to the body, the validation coupon being larger than the cut-out but smaller than the part to be machined.

In some embodiments, wEDM machine assembly comprises the part to be machined, and wherein the part to be machined is one of: a turbine disc, and a compressor disc, and wherein the body is dimensioned to position the validation coupon in the given location when the validation coupon is removably secured to the body of the tool and the body of the tool is removably engaged to the securement assembly of the wEDM machine instead of the part to be machined, and when so secured, the validation coupon is oriented relative to the wEDM machine to permit the wEDM machining assembly to machine the cut-out in the validation coupon.

In some embodiments, the cut-out is a fir-tree shaped cut-out in a periphery of the disc.

In some embodiments, wEDM machine assembly comprises the validation coupon, and wherein the body includes a fastener assembly operable to removably secure the validation coupon to the body, and the body and the fastener assembly together define at least a partial circular periphery which has a diameter that matches a diameter of the one of the turbine disc and the compressor disc.

In some embodiments, wEDM machine assembly comprises the validation coupon, the body and the fastener assembly together define an outer profile of the tool and the outer profile of the tool matches at least a majority of an outer profile of the one of the turbine disc and the compressor disc.

In some embodiments, the engagement feature is an aperture.

In some embodiments, the fastener assembly includes: a block defining in the block a cavity shaped to receive the validation coupon, and a fastener connected to the block and movable between: an open position in which the validation coupon is movable in and out of the cavity, and a closed position in which the fastener secures the validation coupon in the cavity.

In another aspect there is provided a method of manufacturing a tool for validating a part to be machined by a wire-electric-discharge-machining (wEDM) machine, the wEDM machine having a securement assembly configured to removably engage the part to the wEDM machine, the part to have a cut-out machined in a given location in the part using the wEDM machine when the part is removably engaged to the wEDM machine, the given location relative to the wEDM machine, the method comprising: manufacturing a body including an engagement feature shaped to removably engage the securement assembly of the wEDM machine to secure the body to the securement assembly of the wEDM machine instead of the part; and manufacturing a fastener assembly connected to the body, the fastener assembly operable to removably secure a validation coupon to the body, the validation coupon being larger than the cut-out but smaller than the part to be machined, dimensioning the body and the fastener assembly of the tool to: a) position the validation coupon in the given location when the fastener assembly removably receives and secures therein the validation coupon and the body of the tool is removably engaged to the securement assembly of the wEDM machine instead of the part to be machined, and b) orient the validation coupon relative to the wEDM machine by removably engaging the tool to the securement assembly of the wEDM machine to permit the wEDM machining assembly to machine the cut-out in the validation coupon.

In some embodiments, the dimensioning is executed one of: a) prior to one or both of the manufacturing the body and the fastener assembly, and b) after one or both of the manufacturing the body and the fastener assembly, and the method further includes, prior to the manufacturing the body and the fastener assembly, modeling the body and the body and the fastener assembly to define an outer profile of the tool that matches at least a part of an outer profile of the part to be machined.

In some embodiments, the part to be machined is a turbine disc and the step of modeling the body and the fastener assembly includes selecting a thickness and a diameter defined by the tool to at least approximate a thickness and a diameter, respectively, of the turbine disc.

BRIEF DESCRIPTION OF THE DRAWINGS

Reference is now made to the accompanying figures in which:

FIG. 5A is a diagram showing a method of manufacturing the tool of FIG. 2;

FIG. 6 is a diagram showing a method of wEDM a cut-out in a part;

FIG. 7 is a diagram showing another method of wEDM a cut-out in a part;

DETAILED DESCRIPTION

Figure 1:
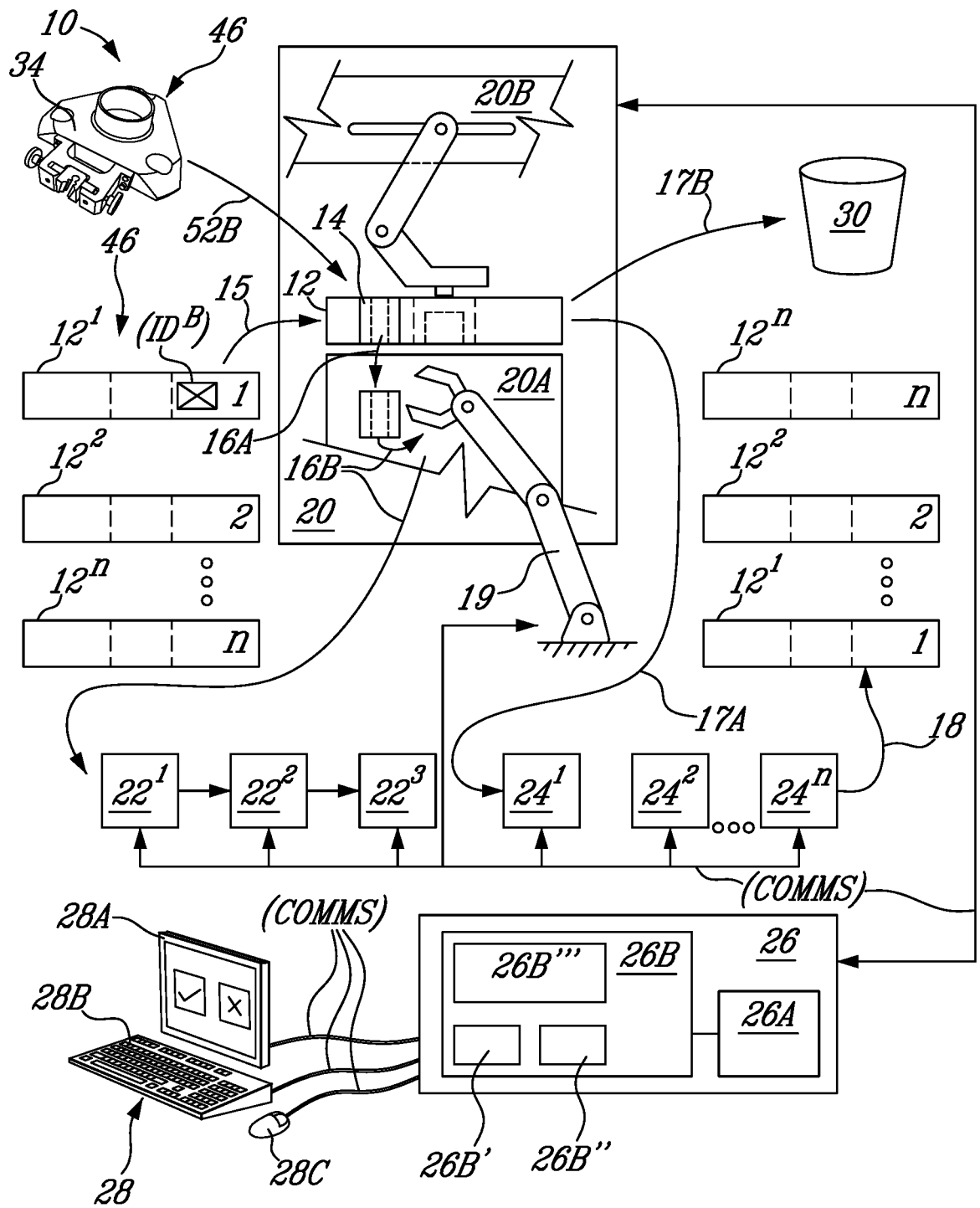
FIG. 1 is a schematic of a system for machining cut-outs in parts using wire-electric-discharge-machining (wEDM) and for validating the parts.
Figure 2:
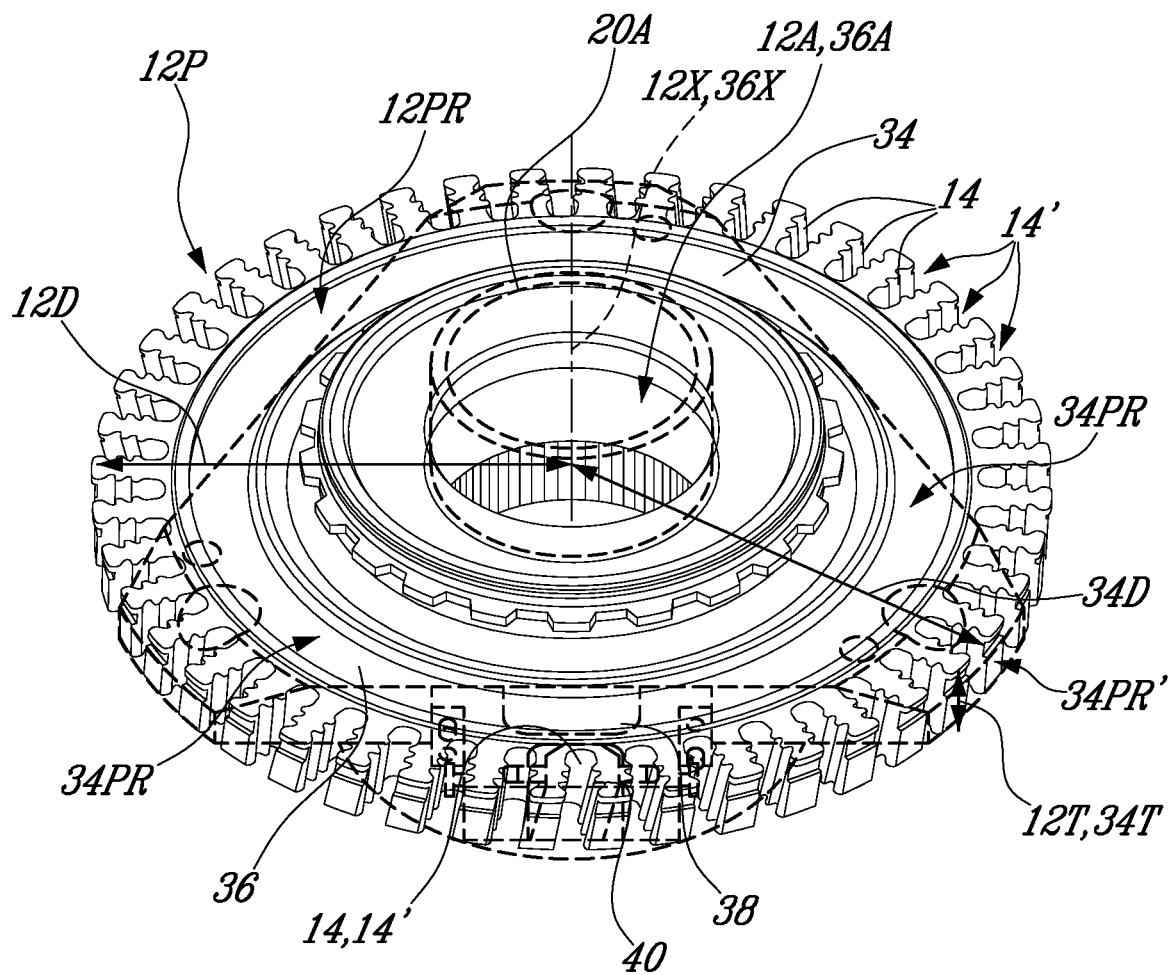
FIG. 2 is a partially transparent perspective view of a part made using the system of FIG. 1 and of a validation tool superposed over the part.

FIG. 1 illustrates a system 10 for machining, in a turbine disc 12, a plurality slots 14. As shown in FIG. 2, in this embodiment the slots 14 are fir-tree shaped and have respective given locations 14' in the turbine disc 12. To maintain clarity, only some of the slots 14 and only some of the respective given locations 14' in the turbine disc 12 have been labeled with their respective reference numerals. As shown in FIG. 2, the turbine disc 12 has a rotation axis 12X defined by an aperture 12A extending through a center of the turbine disc 12, a periphery 12P in which the slots 14 are defined in this non-limiting embodiment, and an outer profile 12PR. The outer profile 12PR includes a diameter 12D and a thickness 12T. As shown, in this embodiment the slots 14 extend through an entirety of the thickness 12T. In some embodiments, the turbine disc 12 may be a conventional turbine disc as used in aerospace applications.

The turbine disc 12 is one example of a part to be machined by the system 10. It is contemplated that in other embodiments, a different part may be machined. Similarly, the slots 14 are one example of a cut-out to be machined in the turbine disc 12. In other embodiments, a different one or more cut-outs may be machined in the turbine disc 12 and/or in other one or more parts. Stated otherwise, the machining and validation systems and methods of the present technology may be applied for manufacturing parts and cut-outs different from the turbine disc 12 and the slots 14. Hence, in embodiments in which a different part is machined, the different part may have a different outer profile 12PR and thickness 12T.

As shown schematically in FIG. 1 with arrows 15, 16A, 16B, 17A, 17B, and 18, in this embodiment the system 10 may be used to manufacture and/or discard/recycle a series $(12^1, 12^2 \ldots 12^n)$ of the turbine disc 12. To this end, in the resent embodiment, the system 10 includes a robotic system 19, a wire-electric-discharge-machining (wEDM) machine 20, validation stations $22^1$, $22^2$, $22^3$, part processing stations $24^1, 24^2 \ldots 24^n$, a controller 26, and an input-output system 28. Also as shown, in some embodiments, a discarding/recycling station 30 may also be provided. Each of these components is described next, in order.

As shown in FIG. 1, in this embodiment, the robotic system 19 may be a conventional robotic system selected and configured using conventional engineering techniques to carry out the functionality described herein. The robotic system 19 is therefore not shown herein in detail and is not described herein in detail. The robotic system 19 may be different than shown, so long as it is capable of providing the functionality and executing the steps described herein. As an example, in some embodiments, the robotic system 19 may include one or more conveyors selected to provide the functionality described herein, and/or may include one or more human operators which may execute at least some of the functionality described herein. In some embodiments, the robotic system 19 may be omitted for example, in which case one or more human operators may be used to carry out the functionality described herein.

Still referring to FIG. 1, the wEDM machine 20 may include a securement assembly 20A configured to removably engage a part to be machined, which in this embodiment is the turbine disc 12 to be machined, to the wEDM machine 20. The wEDM machine 20 may also include a wEDM machining assembly 20B configured to machine the part using a wEDM process, which includes machining a cut-out in a given location in the part. As explained above, in this embodiment, the cut-out may be any given one of the slots 14 in the turbine disc 12, in the given location 14' of that slot 14. For purposes of consistency, in this document, the given location 14' of each given slot 14 is referred to as being relative to the wEDM machine 20 when the turbine disc 12 is removably engaged to the securement assembly 20A of the wEDM machine 20 for being machined by the wEDM machine 20.

In this embodiment, the wEDM machine 20 may be a conventional wEDM machine. Hence, in this embodiment, the securement assembly 20A may be a conventional securement assembly selected and configured for removably engaging turbine discs 12 thereto. Similarly, in this embodiment, the wEDM machining assembly 20B may be a conventional machining assembly selected and configured to machine, using conventional wEDM, the slots 14 that may be required for each given turbine disc 12 that may be removably engaged to the securement assembly 20A, and hence to the wEDM machine 20. The wEDM machine 20 and its possible components are therefore not shown herein in detail and are not described herein in detail. The wEDM machine 20 may be different than shown, so long as it is capable of providing the functionality and executing the steps described herein.

Still referring to FIG. 1, the validation stations $22^1$, $22^2$, $22^3$ in this embodiment include a cleaning station $22^1$. In some embodiments, the cleaning station $22^1$ may be partly or fully automated, such as for example using conventional automation technology selected and configured to provide for the functionality of the cleaning station $22^1$ as described herein. In some embodiments, the cleaning station $22^1$ may be at least in part be operated by human operators to provide for at least some of the functionality of the cleaning station $22^1$ as described herein. In the present embodiment, the cleaning station $22^1$ is fully automated and is positioned relative to the robotic system 19 and the wEDM machine 20 such that the robotic system 19 may be operable to move one or more parts from or from a proximity of the wEDM machine 20 to the cleaning station $22^1$. The cleaning station $22^1$ in this embodiment is configured, using conventional technology for example, to receive a given one or more parts, which may be the turbine disc 12 and/or a part cut from the turbine disc 12, and to execute a cleaning process with respect to the one or more parts. The cleaning process may be conventional and may be selected to suit each particular embodiment of wEDM that may be executed by the wEDM machine 20 and/or each particular material (e.g. alloy) from which the one or more parts may be made. The cleaning process is therefore not described herein in detail.

Still referring to FIG. 1, the validation stations $22^1$, $22^2$, $22^3$ in this embodiment further include a chemical analysis station $22^2$. In some embodiments, the chemical analysis station $22^2$ may be partly or fully automated, such as for example using conventional automation technology selected and configured to provide for the functionality of the chemical analysis station $22^2$ as described herein. In some embodiments, the chemical analysis station $22^2$ may be at least in part be operated by human operators to provide for at least some of the functionality of the chemical analysis station $22^2$ as described herein. In the present embodiment, the chemical analysis station $22^2$ is operatively connected, such as via one or more conventional conveyors and/or the robotic system 19 for example, to the cleaning station $22^1$ so as to automatically receive one or more parts that may be leaving the cleaning station $22^1$ after the one or more parts have been cleaned by the cleaning station $22^1$. The chemical analysis station $22^2$ in this embodiment is fully automated, such as for example using conventional automation technology selected and configured to provide for the functionality of the chemical analysis station $22^2$ as described herein.

Still referring to FIG. 1, the validation stations $22^1$, $22^2$, $22^3$ in this embodiment further include a metallurgical analysis station $22^3$. In some embodiments, the metallurgical analysis station $22^3$ may be partly or fully automated, such as for example using conventional automation technology selected and configured to provide for the functionality of the metallurgical analysis station $22^3$ as described herein. In the present embodiment, the metallurgical analysis station $22^3$ is in part operated by human operators using conventional tools to provide for at least some of the functionality of the metallurgical analysis station $22^3$ as described herein. In other embodiments, the validation stations $22^1$, $22^2$, $22^3$ may have a different configuration and/or a different number of validation stations may be used to provide for the functionality described herein.

Still referring to FIG. 1, the part processing stations $24^1$, $24^2 \ldots 24^n$ may include any number and/or configuration of part processing stations which may be conventional and may be selected for example using conventional engineering techniques to suit each particular series of parts to be produced using the system 10. As a non-limiting example, in the present embodiment, the part processing stations $24^1$, $24^2 \ldots 24^n$ may include a conventional turbine disc balancing station $24^1$ which may be selected and configured to balance the turbine discs 12 machined by the wEDM machine 20, a surface treatment station $24^2$ which may be selected and configured to provide the turbine discs 12 with "final" surface finish(es) that may be required for each given application of the turbine discs 12, and the like.

Still referring to FIG. 1, the controller 26 in this embodiment may be any suitable controller, and may be for example a conventional computer selected and configured using conventional parts and programming techniques to provide for the functionality described herein. As a non-limiting example, to this end in the present embodiment, the controller 26 includes a processor 26A, which may include for example one or more conventional central processing units (CPU(s)), and a non-transitory memory 26B, which may include for example a hard drive. The non-transitory memory 26B stores thereon processor-executable instructions and is operatively connected to the processor 26A, such as via a suitable memory bus for example, to allow the processor 26A to execute the processor-executable instructions to carry out the functionality described herein. The controller 26 may be in communication with one or more of the robotic system 19, the wEDM machine 20, and the station(s) $22^1 \cdots {}^n$, $24^1 \cdots {}^n$, to control/operate these components of the system 10 to provide for the functionality described herein. As an example, the particular combination of operating connections of the controller 26 to one or more of the components of the system 10 may be selected depending on the particular embodiment and extent of automation of the system 10 for example, and may be implemented using any suitable conventional parts and communication protocols. As a non-limiting example, in some embodiments, the communications of the controller 26 to the other components of the system 10 may be wireless, wired, or a combination of wireless and wired. The communications of the controller 26 to the other components of the system 10 in the present embodiment are shown with respective arrows labeled (COMMS).

Still referring to FIG. 1, the input-output system 28 in this embodiment may be any suitable input-output system, which may be for example selected and configured using conventional parts and programming techniques to provide for the functionality described herein. As a non-limiting example, to this end in the present embodiment, the input-output system 28 includes a conventional monitor 28A for displaying information thereon, such as data received from the controller 26 for example, and a conventional keyboard 28B and mouse 28C for entering data into and interacting with the controller 26. It is contemplated that any other input-output system 28 may be used and/or that the input-output system 28 may be part of the controller 26 and/or that the input-output system 28 may be omitted in some embodiments, so long as the functionality of the system 10 as described herein is provided. Stated more broadly, the system 10 may have more or fewer of the components as described herein, and/or different embodiments of the components described herein, to suit each particular embodiment of the methods of the present technology that are described herein.

Figure 3:
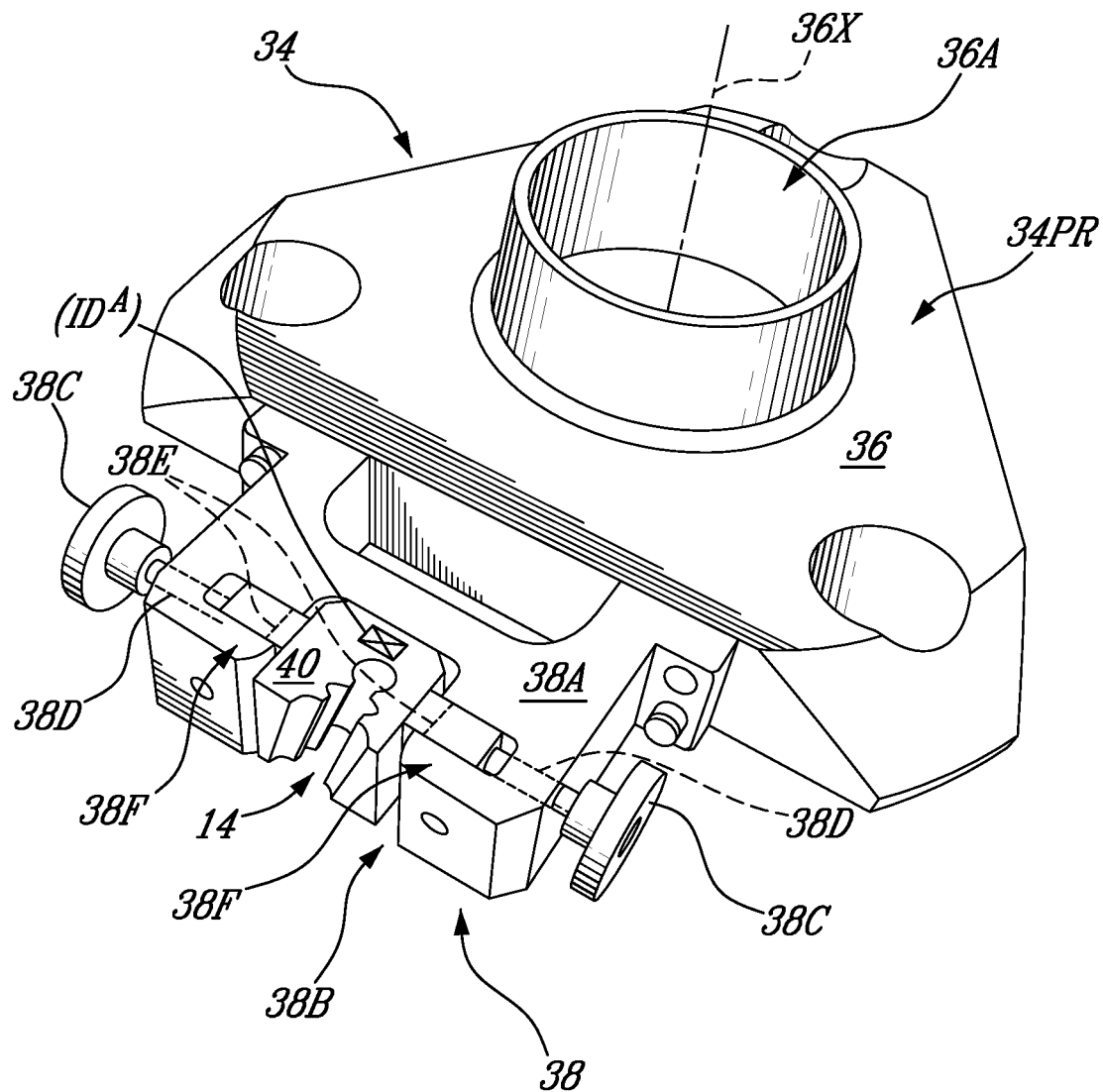
FIG. 3 is a perspective view of the tool of FIG. 2, the tool having a validation coupon removably secured thereto, the validation coupon having a fir-tree shaped slot machined therein.

Referring now to FIGS. 2 and 3, in some embodiments and as described below with respect to methods of the present technology which may for example be implemented using the system 10, the system 10 may be used with a tool 34 for validating one or more parts to be machined by the wEDM machine 20. The tool 34 may include a body 36 including an engagement feature 36A. As shown in FIG. 2 by the tool 34 being superposed over the turbine disc 12, the engagement feature 36A of the tool 34 may be shaped to removably engage the securement assembly 20A of the wEDM machine 20 instead of the part (the turbine disc 12 in this embodiment) to be machined. This allows the tool 34 to be removably engaged to the wEDM machine 20 instead of the part to be machined.

In the present embodiment where the part is the turbine disc 12, and as shown in FIG. 2, the engagement feature 36A of the tool 34 is an aperture 36A extending through the body 36 of the tool 34. Also as shown and although this need not be the case in other embodiments, the aperture 36A in the body 36 of the tool 34 is made to be the same size as the aperture 12A in the turbine disc 12. In this embodiment, the aperture 36A in the body 36 of the tool 34 defines a rotation axis 36X of the tool 34. The rotation axis 36X of the tool 34 may be in the position of the rotation axis 12X of the turbine disc 12 relative to the securement assembly 20A of the wEDM machine 20 when these respective parts are in respective turns mounted to the securement assembly 20A of the wEDM machine 20 as shown in FIG. 2 and as described herein.

Accordingly, as shown in FIG. 2, the turbine disc 12 may be removably engaged to the 20A securement assembly 20A of the wEDM machine 20 via the aperture 12A, and the tool 34 may be removably engaged to the 20A securement assembly 20A of the wEDM machine 20 via the aperture 36A instead of the turbine disc 12. For the purposes of this document, the term "instead of" means that when the part/turbine disc 12 is removed from the securement assembly 20A of the wEDM machine 20, the tool 34 may be mounted to the securement assembly 20A of the wEDM machine 20 in the location that was (or is to be) occupied by the part/turbine disc 12. In other embodiments where the system 10 is used to manufacture a part other than a turbine disc 12, the engagement feature 36A of the tool 34 may be different. In some such embodiments, the engagement feature 36A of the tool 34 may be made using any suitable conventional engineering and manufacturing techniques for example to match the engagement feature(s) of the other part(s) that are may be used to removably engage the other part(s) to the wEDM machine 20.

Figure 4:
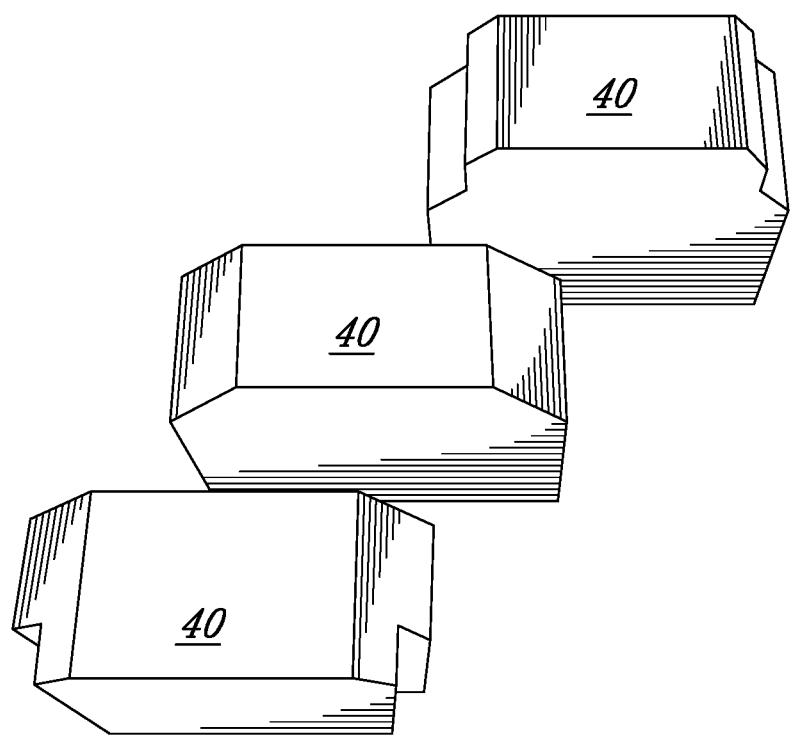
FIG. 4 is a perspective view of new validation coupons that may be used with the tool of FIG. 2.

As best shown in FIG. 3, the tool 34 may further include a fastener assembly 38 connected to the body 36. The fastener assembly 38 may be operable to removably secure a validation coupon 40 to the body 36. In this embodiment the validation coupon 40 is made of the same material as the turbine disc 12, or at least the same material as the part of the turbine disc 12 that has the feature (in this embodiment the fir-tree slot 14) that is to be validated using the validation coupon 40, so as to help mimic the feature, the structure in which the feature is made, and its surface finish. The validation coupon 40 shown in FIG. 3 has had a slot 14 of the turbine disc 12 machined into it, as described later in this document. On the other hand, examples of unused validation coupons 40 that may be used in methods utilizing the tool 34 as described herein, are shown in FIG. 4.

In some embodiments, a given validation coupon 40 that is used with the tool 34 may be larger than a respective cut-out to be machined into a given part that is to be validated by using the tool 34, such as for example a given slot 14 in the case of the turbine disc 12, but smaller than the part to be machined. To this end, in the present embodiment the fastener assembly 38 includes a block 38A defining in the block 38A a cavity 38B shaped to receive the validation coupon 40, and a fastener 38C connected to the block 38A. More particularly, in the present embodiment, there are two fasteners 38C connected to the block 38A at opposite sides of the cavity 38B. Each of the fasteners 38C is threaded through respective threaded apertures 38D in the block 38A and is movable between an open position 38E, shown schematically in FIG. 3, and a closed position 38F. The fasteners 38C are movable into the cavity 38B toward each other when moved from their respective open positions 38E toward their respective closed positions 38E.

In the open position 38E, the fasteners 38C allow the validation coupon 40 to move in and out of the cavity 38B. To this end, and although may not be the case in other embodiments, the cavity 38B faces away from and is open in a direction extending away from the rotation axis 36X of the body 36. In the closed position 38F, the fasteners 38C secure the validation coupon 40 in the cavity 38B. As shown with the turbine disc 12 and the tool 34 being virtually superposed one over the other in FIG. 2, the body 36 and the fastener assembly 38 of the tool 34 are dimensioned relative to the turbine disc 12 such that when the fastener assembly 38 removably receives and secures therein the validation coupon 40, and the body 36 of the tool 34 is secured via the engagement feature 36A to the securement assembly 20A of the wEDM machine 20 instead of the turbine disc 12, the validation coupon 40 is in the given location 14' of one of the slots 14 in the turbine disc 12, and is oriented relative to the wEDM machine 20 to permit the wEDM machine 20 to machine the slot 14 in the validation coupon 40. In an aspect, positioning the validation coupon 40 in the same location as the feature that has or is to be made in the turbine disc 12 using wEDM helps the validation coupon 40 and the validation feature made therein mimic the feature in the turbine disc 12.

In another aspect, this same positioning may allow a coordinate-measuring machine (CMM) to be used to inspect the tool-and-coupon assembly 34, 40 while it's engaged to the wEDM machine 20 to determine whether the validation feature is within a given tolerance band associated with the corresponding feature in the turbine disc/part 12 and/or to provide machine offsets for the turbine disc/part 12 to be machined. In yet a further aspect, since at least in the present embodiment the tool-and-coupon assembly 34, 40 mimics the part to be validated (i.e. the turbine disc 12 in this embodiment) by having at least a substantially same validation feature shape, location, locating diameter and face, the tool-and-coupon assembly 34, 40 may be used as a setup part, thus avoiding sacrifice of real parts (i.e. the turbine discs 12 in this embodiment) for wEDM machine 20 setup purposes.

Referring to FIG. 2, further in the present embodiment, and although need not be the case in other embodiments, the body 36 and the fastener assembly 38 of the tool 34 together define an outer profile 34PR of the tool 34 that at least in part matches the outer profile 12PR of the turbine disc 12 (or other part, if the tool 34 is designed for validating a different type of part as described above). In some embodiments and as shown in FIG. 2 for example, the outer profile 34PR of the tool 34 is selected to match at least a majority of the outer profile 12PR of the turbine disc 12. Such a feature may be referred to as a "mimicking" feature. As shown in FIG. 2, in this embodiment the tool 34 is dimensioned such that a thickness 34T of the tool 34T, and more particularly in this embodiment the thickness 34T of the body 36 of the tool 34, matches the thickness 12T of the turbine disc 12. More particularly, in this embodiment the thickness 34T of the body 36 of the tool 34 approximates, and in some embodiments equals, the thickness 12T of the turbine disc 12. Each of such features may also be referred to as a "mimicking" feature.

As shown in FIG. 2, in this embodiment the tool 34 is further dimensioned, for example using any suitable manufacturing method, such that the outer profile 34PR of the tool 34 includes peripheral portions forming at least a partial circular peripheral profile 34PR' that has a diameter 34D that equals the diameter 12D of the outer profile 12PR of the turbine disc 12. In other embodiments, the tool 34 may be dimensioned to form a circular peripheral profile 34PR' with a diameter 34D matching the diameter 12D of the outer profile 12PR of the turbine disc 12. In an aspect, one or more of the "mimicking" features of the tool 34, where present, may help improve an accuracy and/or reliability of methods executed using the tool 34 as described herein. While providing advantages in at least some applications and embodiments, in other applications and/or embodiments, one or more of the "mimicking" features of the tool 34 may be omitted.

As best shown in FIG. 3, in the present embodiment, the fastener assembly 38 is connected to the body 36 of the tool 34 by being riveted or otherwise suitably attached to the body 36. In other embodiments, the fastener assembly 38 may be connected to the body 36 of the tool 34 in any other suitable way, such as by being made integral with the body 36 for example. In other embodiments, a different number and/or configuration of fasteners 38C, and or a different fastener assembly 38 may be used to provide for the functionality of the tool 34 as described herein. In some embodiments, the tool 34 may include more than one fastener assembly 38 to simultaneously secure more than one validation coupon 40 thereto, so that for example at least some of the embodiments of validation methods described herein below may be executed simultaneously with respect to more than one cut-out/slot 14 of a given part 12 and with respect to the more than one corresponding validation coupon 40.

Now referring to FIG. 5A, the present technology provides a method 50A of manufacturing a tool, such as the tool 34, for validating a part to be machined, such as the turbine disc 12, by a wEDM machine, such as the wEDM machine 20. The method 50A includes a step 52A of manufacturing a body 36 including an engagement feature 36A shaped to removably engage the securement assembly 20A of the wEDM machine 20 to secure the body 36 to the securement assembly 20A of the wEDM 20 machine instead of the disc/part 12. The method 50A may also include a step 54A of manufacturing a fastener assembly/engagement feature 38 connected to the body 36, the fastener assembly/engagement feature 38 operable to removably secure a validation coupon 40 to the body 36, the validation coupon 40 being larger than the cut-out 14 but smaller than the part 12 to be machined.

The method 50A may further include, as part of one or both steps 52A, 54A or subsequent thereto for example, a step 56A of dimensioning the body 36 and the fastener assembly/engagement feature 38 of the tool 34 to: a) position the validation coupon 40 in the given location 14' of the cut-out 14 (e.g. of one of the cut-outs 14 for example) when the fastener assembly/engagement feature 38 removably receives and secures therein the validation coupon 40 and the body 36 of the tool 34 is removably engaged to the securement assembly 20A of the wEDM machine 20 instead of the part 12 to be machined, and b) orient the validation coupon 40 relative to the wEDM machine 20 by removably engaging the tool 34 to the securement assembly 20A of the wEDM machine 20 to permit the wEDM machining assembly 20B of the wEDM machine 20 to machine the cut-out 14 in the validation coupon 40.

In some embodiments, the step 56A of dimensioning may be executed one of: a) prior to one or both of the manufacturing the body 36 and the fastener assembly/engagement feature 38, such as in a suitable computer aided design (CAD) software or using a physical mock-up/model for example, and b) after one or both of the manufacturing the body 36 and the fastener assembly/engagement feature 38. In some such embodiments, the method 50A may further include, prior to the manufacturing the body 36 and the fastener assembly/engagement feature 38, modeling the body 36 and the fastener assembly/engagement feature 38 (e.g. via CAD or physical model(s)) to define an outer profile 34PR of the tool 34 that matches at least a part of an outer profile 12PR of the part 12 to be machined. In some embodiments, the part 12 to be machined is a turbine disc 12 and the step of modeling the body 36 and the fastener assembly/engagement feature 38 includes selecting a thickness 34T and a diameter 34D defined by the tool 34 to at least approximate a thickness 12T and a diameter 12D, respectively, of the turbine disc 12.

In summary, in some applications for example, the tool 34 may be manufactured, for example using the method 50A, specific to a particular one or more parts, such as the turbine disc 12, for validating multiple iterations of the one or more parts being made using one or more wEDM machines, such as the wEDM machine 20. To this end, and for example referring to FIGS. 1 and 2, a validation kit 46 comprising the tool 34 and the one or more parts ($12^1$, $12^2$ ... $12^n$) to be validated using the tool 34 are described herein next.

A given validation kit 46 may for example include the tool 34 and multiple turbine discs 12, such as the series ($12^1$, $12^2$ ... $12^n$) shown in FIG. 1, that are to be machined. The tool 34 and the part(s) 12 in each given validation kit 46 may include any given combination of the various features described herein above with regard to the tool 34 and the part(s) 12. As an example, and as shown schematically in FIG. 1 to the left of the wEDM machine 20, the series ($12^1$, $12^2$ ... $12^n$) of turbine discs 12 to be machined may be in a form of shaped forgings that may have some of the turbine disc features but may not yet have the slots 14 and/or other features that are to be made by wEDM and in some cases by additional processes executed post-wEDM. The given validation kit 46 may be used as described next for example, to wEDM the slots 14 and/or other cut-outs in the turbine discs 12, and to validate the turbine discs 12 as being acceptable for use and/or further processing.

Figure 5B:
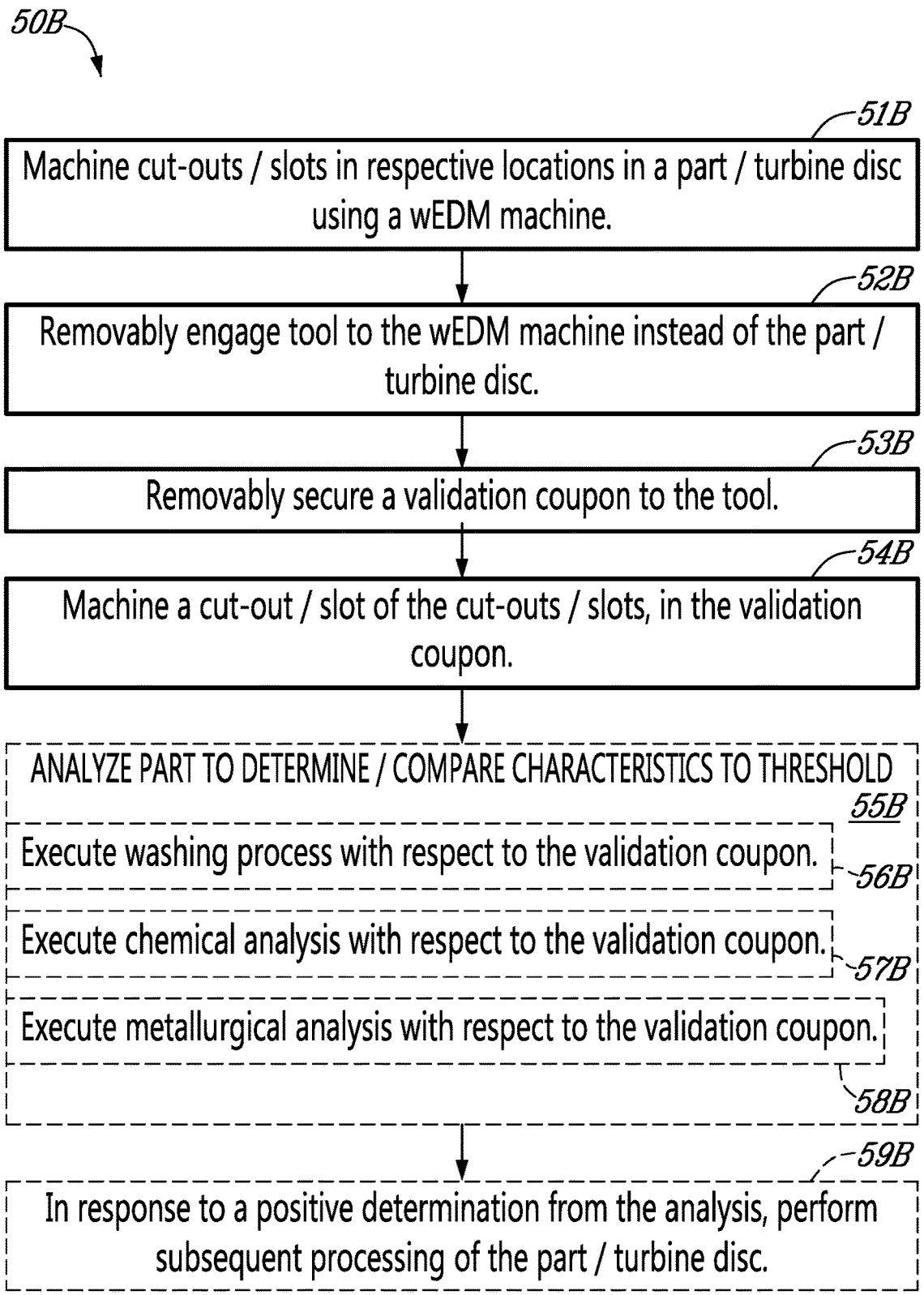
FIG. 5B is a diagram showing a method of making and validating a part using the system 10 and the tool of FIG. 2.

To this end, and referring to FIGS. 1 and 5B, the present technology provides a method 50B of wire-electric-discharge-machining (wEDM) a cut-out, such as a slot 14, in a given location 14' in a part, such as a given turbine disc 12, the cut-out having a given shape, such as the fir-tree shape of the slot 14, once the part is machined. The method 50B may include a step 15, also shown schematically in FIG. 1 with arrow 15, of removably engaging the part/turbine disc 12 to the wEDM machine 20. The method 50B may proceed with a step 51B of controlling the wEDM machine 20, using for example the controller 26, to machine using a wEDM process one or more of the cut-outs/slots 14 in their respective locations 14' in the part/turbine disc 12 to one or more surface finishes. In the particular non-limiting embodiment, the slots 14 may be wEDM'ed by the wEDM machine 20 to all have one and the same surface finish. As an example, the surface finish may be achieved by the wEDM machining assembly 20B first executing a wEDM roughing pass along the respective shapes of the slots 14 to remove respective parts of the turbine disc 12 thereby creating the slots 14, as shown in FIG. 1 with arrow 16A with respect to one of the slots 14. The wEDM machining assembly 20B may then execute a wEDM finishing pass followed by a wEDM polishing pass along the surfaces created by the roughing pass and defining the slots 14.

The of method 50B may further include a step 52B of removably engaging the tool 34, and more particularly the engagement feature 36A thereof, to the wEDM machine 20, and more particularly to the securement assembly 20A, instead of the turbine disc 12. In some embodiments, step 52B may be performed prior to the steps 15 and 51B. As another example, in some embodiments, step 52B may be performed after to steps 15 and 51B. The method 50B may further include a step 53B of removably securing a validation coupon 40 to the tool 34. In some embodiments, the validation coupon 40 may be made from the same material(s) as the part/turbine disc 12 to be validated using the validation coupon 40. In some embodiments, the validation coupon 40 may be made from the batch of material(s) that was used to make the part/turbine disc 12 to be validated using the validation coupon 40.

In the non-limiting embodiment of the tool 34 shown in FIGS. 2 and 3, removable securement step 51B may include inserting the validation coupon 40 into the cavity 34B while the fastener(s) 38C are in their respective open positions 38E, and then moving the fastener(s) 38C toward their respective closed positions 38F until the validation coupon 40 is secured to the tool 34. In some embodiments, step 53B may be performed before step 52B. In some embodiments, step 53B may be performed after step 52B. In some embodiments, and depending on the particular embodiment of the tool 34 for example, the method 50B may include positioning the tool 34 with the validation coupon 40 secured thereto relative to the securement assembly 20A of the wEDM machine 20 until the validation coupon 40 is in the given location 14' (taken relative to the wEDM machine 20) of a given slot 14 that is to be, or which has been, machined in the turbine disc 12. In some embodiments, the positioning step may be performed manually or by a suitable robotic system 19 for example, as part of or after the step 52B of removably engaging the tool 34 to the wEDM machine 20. FIG. 2 shows the tool 34 being positioned relative to the securement assembly 20A of the wEDM machine 20 and relative to the turbine disc 12 such that the validation coupon 40 is in the given location 14' of a given slot 14.

The method 50B may further include a step 54B of controlling the wEDM machine 20, for example by the controller 26, to wEDM (a duplicate of) the given slot 14 that has, or is to be, wEDM'ed in the turbine disc 12, in the validation coupon 40. In the present embodiment, the wEDM machine 20 may be controlled using the controller 26 to execute the same series of passes as executed, or to be executed, in the step 51B of machining the slot(s) 14 in the turbine disc 12 to provide the same surface finish(es) to a resulting surface on the validation coupon 40 as the surface finish(es) that was/were targeted for the respective slot(s) 14 in the turbine disc 12. The slot 14 machined in the validation coupon 40 is shown in FIG. 3. In some embodiments, once step 54B has been performed, the validation coupon 40 may be for removed manually, or automatically via a suitable embodiment of the robotic system 19 for example, from the tool 34.

An analysis step 55B may then be performed on the validation coupon 40 to determine whether or not the validation coupon 40 and/or the surface defining the cut-out/slot 14 in the validation coupon 40 meet a set of characteristics that the part/turbine disc 12 may need to be considered acceptable for a given one or more applications. According to the present technology, it has been found that results of the analysis step 55B performed with respect to the validation coupon 40 at least as described herein may be representative of results that may be obtained using a same analysis process that may be performed with respect to the part/turbine disc 12.

The method 50B may further include a step of comparing/determining whether results from the analysis step 55B are indicative that the cut-out/slot 14 in the validation coupon 40 and/or the validation coupon 40 has/have a set of characteristics that meets the set of characteristics associated with the part/turbine disc 12. In some embodiments, the determination step may be part of the analysis step 55B and may be performed by the controller 26. Where the determination is positive, the part/turbine disc 12 may be designated as acceptable. As an example shown in FIG. 1, a positive designation may be generated by the controller 26 as a corresponding "positive" file or indicator 26B' stored in the non-transitory memory 26B, while a negative designation may be generated by the controller 26 as a corresponding "negative" file or indicator 26B" stored in the non-transitory memory 26B. Representative corresponding visual indicators may be in some embodiments displayed to an operator via the input-output system 28 associated with the controller 26.

In some embodiments, and depending on each particular embodiment of the part/turbine disc 12 to be machined and validated, the analysis step 55B may be performed using conventional analysis tools and methods suitable for the particular part. The analysis step 55B may also be implemented using the present technology, as described next. According to the present technology, the analysis step 55B may include a step 56B of executing a cleaning process with respect to the validation coupon 40, for example using the cleaning station $22^1$. In some embodiments in which the cut-outs/slots 14 are machined in the part/turbine disc 12 prior to machining a cut-out/slot 14 in the validation coupon 40, the cleaning process may be executed simultaneously with respect to both the validation coupon 40 and the part/turbine disc 12 after the cut-out/slot 14 has been machined in the validation coupon 40. In an aspect, this may help improve efficiency of the method 50B.

Once the cleaning step 56B has been completed, a chemical analysis step 57B may be performed with respect to the validation coupon 40 using for example the chemical analysis station 22² to determine a set of chemical characteristics of the cut-out/slot 14 in the validation coupon 40 and/or the validation coupon 40. In a non-limiting example, the set of chemical characteristics includes concentrations of a plurality of elements. At step 59B, the controller 26 may receive the set of chemical characteristics, for example via automatic input and/or manual input via the input-output system 28, and determine whether the set of chemical characteristics meets a threshold set of chemical characteristics. Upon a positive determination, the controller 26 may designate the validation coupon 40 as acceptable for a subsequent metallurgical analysis step 58B, which may be performed using for example the metallurgical analysis station 22³.

The controller 26 may receive the set of metallurgical characteristics from the metallurgical analysis step 58B, for example via automatic input and/or manual input via the input-output system 28, and may determine whether the set of metallurgical characteristics meets a threshold set of metallurgical characteristics associated with the part/turbine disc 12. In some embodiments, the metallurgical analysis step 58B may include destructive testing involving cutting the validation coupon 40 into multiple cross-sections and/or chemical etching and/or scanning for cracks, with corresponding generation of results. Upon a positive determination from the metallurgical characteristics comparison, the controller 26 may designate the part/turbine disc 12 as acceptable for use and/or subsequent processing and/or use, depending on the particular part 12 and intended application thereof for example.

Such subsequent processing, where required, may be executed for example using the part processing stations 24¹, 24² . . . 24ⁿ described above. The method 50B may accordingly proceed with a step 59B of subjecting the part/turbine disc 12 to the subsequent processing to arrive at a completed part/turbine disc 12. It is contemplated that depending on the particular part to be machined and validated, no subsequent processing steps may be needed. On the other hand, upon a negative determination, the controller 26 may designate the part/turbine disc 12 as unacceptable for use and/or subsequent processing. In such cases, the part/turbine disc 12 may be scrapped and/or recycled, as shown with arrow 17B in FIG. 1.

In some embodiments in which the validation coupon 40 is analyzed prior to cut-outs/slots 14 being machined into a corresponding part/turbine disc 12, upon a negative determination, the controller 26 may prevent machining of the cut-outs/slots 14 until the wEDM machine 20 is tuned to eliminate cause(s) of the negative determination. The method 50B may then be repeated with respect to one or more new validation coupons 40 for that same part/turbine disc 12, with possible subsequent tuning of the wEDM machine 20 in cases of subsequent negative determinations, until a positive determination is achieved. In response to the positive determination, the part/turbine disc 12 may be removably engaged to the wEDM machine 20 instead of the tool 34, and the controller 26 may control the wEDM machine 20 to machine the cut-outs/slots 14 in the part/turbine disc 12 with the corresponding positive determination assigned thereto.

In the present embodiment, the method 50B uses one validation coupon 40 to validate each turbine disc 12. In some embodiments, the method 50B may use multiple validation coupons 40 to validate each turbine disc 12. In some embodiments, the method 50B may use one validation coupon 40 to validate each batch of multiple turbine discs 12. To this end, and as shown in FIG. 3, a unique identifier ($ID^A$), such as a 2-D matrix ID for example or other suitable conventional identifier, may be attached to or engraved in each validation coupon 40. Similarly, a unique identifier ($ID^A$), such as a 2-D matrix ID for example or other suitable conventional identifier, may be attached to or engraved in each part/turbine disc 12.

The input-output system 28 and/or the wEDM machine 20 and/or one or more of the stations 22¹, 22², 22³, 24¹, 24² . . . 24ⁿ may be configured using conventional code reader technology for example. The unique ID's may be stored in the non-transitory memory 26B and may be received by the controller 26 at one or more of the steps of each given method described herein. The controller 26 may cross-reference the unique ID's ($ID^A$) and ($ID^B$) to maintain a unique matching between each given validation coupon 40 and the part(s)/turbine disc(s) 12 to be validated using the that validation coupon 40.

As an example, as can be seen from the above, in an aspect, the method 50B may be more efficient than prior art manufacturing and validation methods according to which otherwise good parts out of a given series of parts produced may have been destructed to validate the remaining parts in that series.

The present technology further provides various additional methods which may be practiced, for example, using one or more of the corresponding non-limiting embodiments of the system 10 to make and validate various parts. Some such methods do not require using the tool 34 described above.

For example, referring to FIGS. 1, 6 and 7-8, there is provided a method 60 of wire-electric-discharge-machining (wEDM) a feature, such as a cut-out, and more particularly in some embodiments one or more of the slots 14, in a part, such as the turbine disc 12, with the feature having a given shape, such as the fir-tree shape in the case of the one or more of the slots 14, once the part is machined. The method 60 may be performed using the system 10, as described in detail next. While the method 60 is described herein with respect to wEDM fir-tree shaped cut-outs 14 in a turbine disc 12, in other embodiments and applications the method 60 may be used to define one or more other features and/or to make/validate other parts having such feature(s), including but not limited to compressor discs and integrally bladed rotors. As an example, one or more other features 14 need not be fir-tree shaped.

Figure 8:
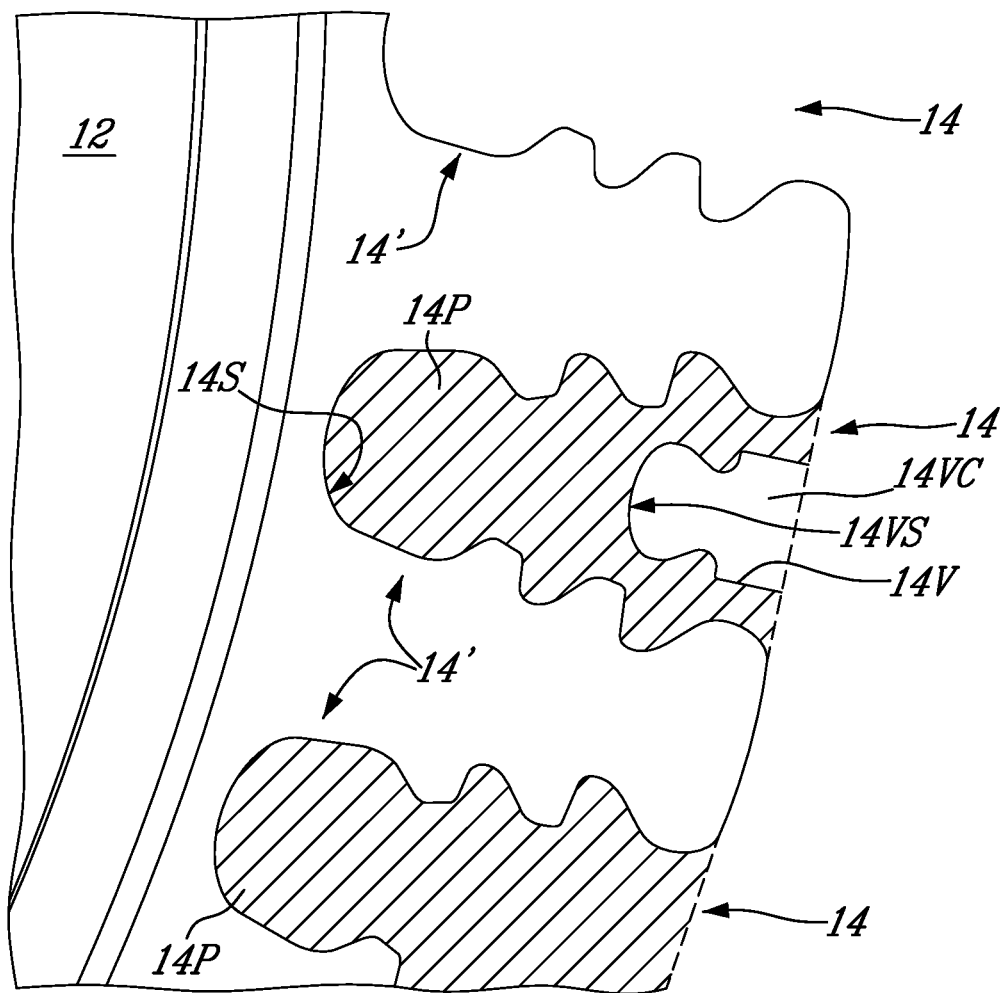
FIG. 8 is a plan view of one face of a turbine disc with slots machined therein using the system of FIG. 1, and with an outline of a validating machining path through the turbine disc as executed prior to machining at least a corresponding one of the slots.
Figure 9:
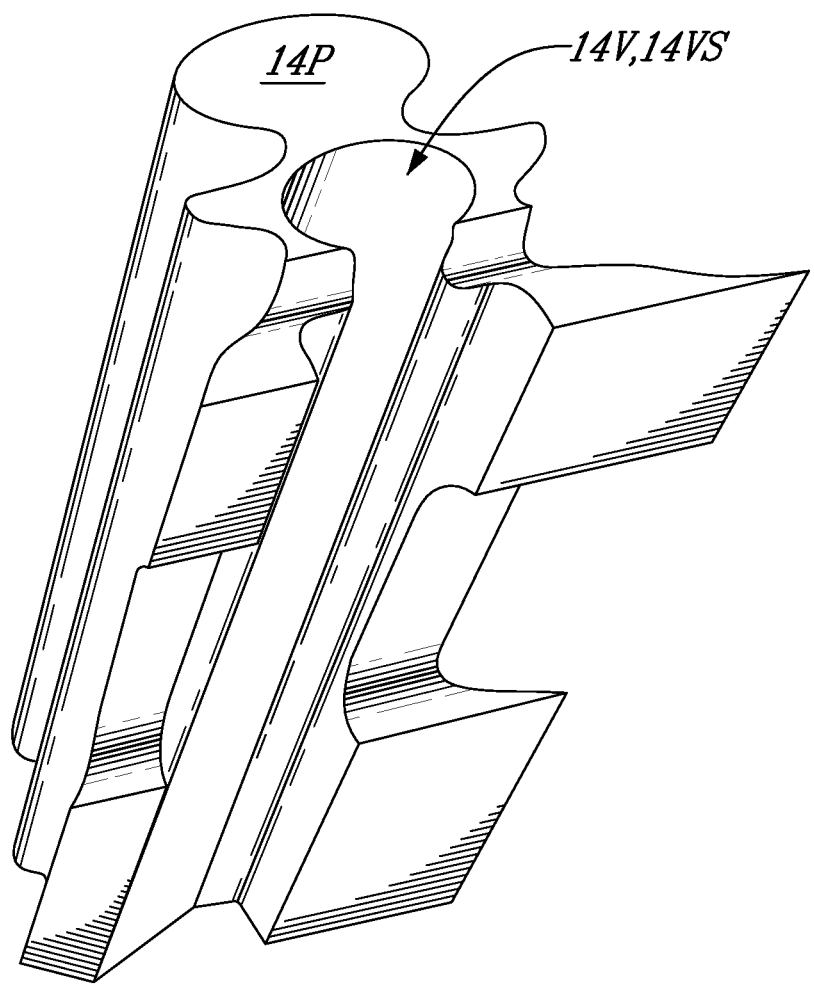
FIG. 9 is a perspective view of a validation coupon made using the validating machining path of FIG. 8.

Referring to FIGS. 6 and 8, in some embodiments, the method 60 includes a step 62 of, using wEDM, cutting and detaching a slug 14VC from a portion 14P of the part, such as the turbine disc 12, which portion 14P is to be detached from the part 12 to define a feature, such as a given one of the slots 14 to be machined in the turbine disc 12 in this example, and thereby defining a validation cut-out 14V in the portion 14P. As shown in FIG. 8, in this example, the validation cut-out 14V is fir-tree shaped, which helps provide an improved accuracy of validation of the feature 14/part 12. That said, other shapes of the validation cut-out 14V may also be used, and it at least some applications some such other shapes need not mimic a shape of the feature(s) 14 to be validated using the validation cut-out 14V.

The method 60 further includes a step 64 of, using wEDM, cutting and detaching the portion 14P having the validation cut-out 14V from the part 12 and thereby defining the feature 14. As seen in FIG. 8, in this embodiment, the portion 14P is cut by executing wEDM along the predetermined/desired shape of the feature 14, and more particularly along the fir-tree shape of the slot 14 in this non-limiting example. In the present example, the steps 62 and 64 are executed using the wEDM machine 20.

Referring to FIG. 8, upon completion of step 62, the validation cut-out 14V has a surface 14VS. In some embodiments of the method 60, the step 62 of cutting and detaching the slug 14VC includes executing a plurality of wEDM passes along the surface 14VS to give the surface a surface finish, such as a surface finish that a surface 14S of the feature 14 is to have. To this end, a plurality of wEDM passes may be executed to define the surface 14VS of the validation cut-out 14V, such as for example a roughing pass along the shape of the validation cut-out 14V to detach the slug 14VC followed by a finishing pass and a polishing pass along the surfaces 14VS created by the roughing pass.

In some embodiments, a set of wEDM cutting parameters, such as the set of wEDM cutting parameters 26B" (FIG. 1), may be used to execute the plurality of wEDM passes. An additional iteration of the plurality of wEDM passes may then be executed, for example using the set of wEDM cutting parameters 26", to perform step 64 and to thereby give the same surface finish to the surface 14S of the feature 14. In some embodiments, the set of wEDM cutting parameters 26" may be used to execute additional iteration of the plurality of wEDM passes to define multiple features 14 of the part 12, and in this embodiment all of the slots 14 for example, and to give the surface(s) of each of the features 14 the same surface finish.

The method 60 may allow to produce the detached portion 14P in a way that may allow to perform analysis, such as described with respect to step 55B of method 50B above, with respect to the detached portion 14P, and/or the validation cut-out 14V therein, as proxy(ies) for the feature(s) 14 of the part 12. That is, as shown at 66 in FIG. 6, the detached portion 14P having the validation cut-out 14V, and the validation cut-out 14V, may be analyzed to determine a set of characteristics and compare these to a threshold set of characteristics. The set of characteristics of the portion 14P and/or validation cut-out 14V may be indicative of the set of characteristics of the feature(s) 14 and/or the part 12, and hence may be used to determine whether or not the feature 14 and/or the part 12 are suitable for their intended application(s), such as described with respect to step 55B of method 50B above for example.

In some embodiments, the set of characteristics may be selected from conventional characteristics suitable for the particular application that the part 12 is to have. In some embodiments, the step 66 of determining the set of characteristics may include executing a cleaning process, for example using the cleaning station 22$^1$ of the system 10 of FIG. 1, with respect to the portion 14P of the part 12. In some embodiments, the step 66 of determining the set of characteristics may include analyzing the surface 14VS of the validation cut-out 14V after the step of executing the cleaning process. In some embodiments, the step 66 of determining the set of characteristics may include executing a metallurgical analysis process, such as using the metallurgical analysis station 22$^3$ of the system 10 of FIG. 1, with respect to the portion 14P of the part 12. As described above, in some embodiments, the metallurgical analysis process may include cutting the portion 14P of the part 12 into multiple parts and/or carrying out analyses with respect to the multiple parts. Such analyses may include detecting cracks and/or other surface imperfections and/or other anomalies that may have been introduced into the portion 14P by the wEDM machine 20. Depending on the particular application(s) that the part 12 is to have, the steps involved in and/or the set of characteristics may be different.

Once the set of characteristics is determined, the set of characteristics may be compared to a set of threshold characteristics associated with the part 12 and/or the feature(s) 14. The set of threshold characteristics may be selected, for example using conventional engineering methods, to suit the particular application(s) that the part 12 is to have. Where the determined set of characteristics meets the set of threshold characteristics associated with the part 12 and/or the feature(s) 14, the method 60 may proceed with a step 68 of designating the feature(s) 14 in the part 12, and/or the part 12, as acceptable, and else, designating the feature(s) 14 in the part 12, and/or the part 12 as unacceptable. As used herein, the term "acceptable" means acceptable/validated for the intended application(s), and the term "unacceptable" means unacceptable/not validated for the intended application(s). Where a given part 12 is found acceptable/is validated, the part 12 may be put into its intended use(s) and/or subjected to further post processing, for example using additional stations shown in FIG. 1, to ready the part 12 for its intended use(s). Where a given part 12 is found unacceptable/not validated, the part 12 may be discarded and or recycled for example.

Now referring to FIGS. 1 and 7, in a more particular embodiment, the present technology also provides a method 70 of defining a plurality of slots 14 in a turbine disc 12, the slots 14 being fir-tree shaped and having respective given locations 14' in the turbine disc 12. The method 70 may be performed using the system 10, as described in detail next. In some embodiments, the method 70 includes a step 72 of executing a roughing pass to define a fir-tree shaped validation cut-out 14V in the turbine disc 12 in the given location 14' of a given slot 14 of the slots 14, the validation cut-out 14V having a validation surface 14VS, and a step 74 of executing at least one additional pass along the validation surface 14VS to give the validation surface 14VS a surface finish.

The method 70 also includes a step 76 of wEDM the slots 14 in the turbine disc 12 in respective ones of the given locations 14' by executing respective iterations of the roughing pass with respect to the slots 14, the step of wEDM the slots 14 removing from the turbine disc 12 a portion 14P of the turbine disc 12 having the validation cut-out 14V. The method 70 also includes a step 78 of executing respective iterations of the at least one additional pass along surfaces 14S of the turbine disc 12 defining the slots 14 to give the surfaces 14S of the turbine disc 12 the surface finish. The method 70 may thus provide at least one portion 14P having a validation cut-out 14V and a validation surface 14VS that are representative of the slots 14 and their respective surfaces 14S. The portion 14P may then be analyzed and in some cases additionally processed according to steps 55B and 59B described above for example, to validate the turbine disc 12 and prepare it for use.

The above description is meant to be exemplary only, and one skilled in the art will recognize that changes may be made to the embodiments described without departing from the scope of the invention disclosed. For example, while the present methods and systems have been described with respect to wEDM, it is contemplated that they may be applied to other processes for creating cut-outs or other features in various parts.

As another example, while the methods may include analysis and post-analysis processing steps as described above, in some cases the analysis and post-analysis processing steps may be omitted. More particularly, in some cases the methods above may be used to make for example a part and a corresponding one or more validation coupons, which may then be provided to a third party for analysis and post-analysis processing steps.

As yet another example, while the turbine discs 12 described above are produced with three wEDM passes for each slot 14, a different number of machining passes and/or types of machining may be used for example depending on each particular application and/or embodiment of the turbine disc 12 and/or other part.

As yet another example, while the "mimicking" features of the tool 34 described above may provide advantages in some applications, such as for example improving a reliability of the associated validation methods, the "mimicking" features may be omitted in other embodiments.

As yet another example, positioning the validation coupons 40 into the respective given positions 14' of the respective cut-outs/slots 14 relative to the wEDM machine 20 as described above may provide advantages in some applications, such as for example improving a reliability of the associated validation methods, this step may be omitted in other embodiments of the methods.

As yet another example, in some embodiments the systems and methods described herein may be used to wEDM and/or validate features in parts other than turbine discs 12 of a gas turbine engine. For example, in some embodiments the systems and methods described herein may be used to wEDM and/or validate features, such as fir-tree slots, in compressor disc(s) of a gas turbine engine. In such embodiments, the turbine disc 12 is thus a compressor disc of a gas turbine engine.

Still other modifications which fall within the scope of the present invention will be apparent to those skilled in the art, in light of a review of this disclosure, and such modifications are intended to fall within the appended claims.

The invention claimed is:

1. A validation kit, comprising:
   a part, wherein the part has an outer profile having a thickness and a diameter; and
   a tool for validating a wire-electric-discharge-machining (wEDM) operation to be performed on the part using a wEDM machine, the tool having, a body including an engagement feature shaped to removably hold a validation coupon to be machined in the wEDM operation, the validation coupon sized larger than a size of a cut-out to be made in the part using the wEDM machine, the body and the engagement feature of the tool together defining an outer profile of the tool that at least in part matches the outer profile of the part.

2. The validation kit of claim 1, wherein the engagement feature includes:
   a block defining in the block a cavity shaped to receive the validation coupon, and
   a fastener connected to the block and movable between:
      an open position in which the validation coupon is movable in and out of the cavity, and
      a closed position in which the fastener secures the validation coupon in the cavity.

3. The validation kit of claim 2, wherein the fastener is a plurality of fasteners.

4. The validation kit of claim 3, wherein the plurality of fasteners includes at least two fasteners disposed on opposite sides of the cavity and movable into the cavity toward each other when moved from their respective open positions toward their respective closed positions.

5. The validation kit of claim 2, wherein the block is one of integral with and attached to the body.

6. The validation kit of claim 1, wherein the engagement feature is an aperture extending through the body.

7. The validation kit of claim 1, wherein the part includes an aperture having a diameter and a rotation axis that defines the diameter of the outer profile of the part, and the engagement feature of the tool is an aperture having the diameter of the aperture in the part.

8. The validation kit of claim 7, wherein the cut-out is to be made in a given location in the part when the part is removably engaged to the securement assembly of the wEDM machine, the given location relative to the wEDM machine.

9. A validation kit, comprising:
   a part; and
   a tool for validating a wire-electric-discharge-machining (wEDM) operation to be performed on the part using a wEDM machine, the tool having a body including an engagement feature shaped to removably hold a validation coupon to be machined in the wEDM operation, the validation coupon sized larger than a size of a cut-out to be made in the part using the wEDM machine,
   wherein the body and the engagement feature of the tool are dimensioned relative to the part such that when the engagement feature removably receives and secures therein the validation coupon and the body of the tool is secured via the engagement feature to the securement assembly of the wEDM machine instead of the part, the validation coupon is in the given location and is oriented relative to the wEDM machine to permit the wEDM machine to machine the cut-out in the validation coupon.

10. A wire-electric-discharge-machining (wEDM) machine assembly, comprising:
    a wEDM machine that includes a securement assembly configured to removably engage a part to be machined to the wEDM machine and a wEDM machining assembly configured to machine the part using a wEDM process, including machining a cut-out in a given location in the part, the given location relative to the wEDM machine; and
    a tool that includes:
       a body including an engagement feature shaped to removably engage the body to the securement assembly of the wEDM machine, and a fastener assembly operable to removably secure a validation coupon to the body, the validation coupon being larger than the cut-out but smaller than the part to be machined.

11. The wEDM machine assembly of claim 10, comprising the part to be machined, and wherein the part to be machined is one of: a turbine disc, and a compressor disc, and wherein the body is dimensioned to position the validation coupon in the given location when the validation coupon is removably secured to the body of the tool and the body of the tool is removably engaged to the securement assembly of the wEDM machine instead of the part to be machined, and when so secured, the validation coupon is oriented relative to the wEDM machine to permit the wEDM machining assembly to machine the cut-out in the validation coupon.

12. The wEDM machine assembly of claim 11, wherein the cut-out is a fir-tree shaped cut-out in a periphery of the disc.

13. The wEDM machine assembly of claim 12, comprising the validation coupon, and wherein the body includes a fastener assembly operable to removably secure the validation coupon to the body, and the body and the fastener assembly together define at least a partial circular periphery which has a diameter that matches a diameter of the one of the turbine disc and the compressor disc.

14. The wEDM machine assembly of claim 13, wherein the validation coupon, the body and the fastener assembly together define an outer profile of the tool and the outer profile of the tool matches at least a majority of an outer profile of the one of the turbine disc and the compressor disc.

15. The wEDM machine assembly of claim 14, wherein the engagement feature is an aperture.

16. The wEDM machine assembly of claim 14, wherein the fastener assembly includes:
 a block defining in the block a cavity shaped to receive the validation coupon, and
 a fastener connected to the block and movable between:
  an open position in which the validation coupon is movable in and out of the cavity, and
  a closed position in which the fastener secures the validation coupon in the cavity.

17. A method of manufacturing a tool for validating a part to be machined by a wire-electric-discharge-machining (wEDM) machine, the wEDM machine having a securement assembly configured to removably engage the part to the wEDM machine, the part to have a cut-out machined in a given location in the part using the wEDM machine when the part is removably engaged to the wEDM machine, the given location relative to the wEDM machine, the method comprising:
 manufacturing a body including an engagement feature shaped to removably engage the securement assembly of the wEDM machine to secure the body to the securement assembly of the wEDM machine instead of the part; and
 manufacturing a fastener assembly connected to the body, the fastener assembly operable to removably secure a validation coupon to the body, the validation coupon being larger than the cut-out but smaller than the part to be machined,
 dimensioning the body and the fastener assembly of the tool to:
  a) position the validation coupon in the given location when the fastener assembly removably receives and secures therein the validation coupon and the body of the tool is removably engaged to the securement assembly of the wEDM machine instead of the part to be machined, and
  b) orient the validation coupon relative to the wEDM machine by removably engaging the tool to the securement assembly of the wEDM machine to permit the wEDM machining assembly to machine the cut-out in the validation coupon.

18. The method of claim 17, wherein:
 the dimensioning is executed one of: a) prior to one or both of the manufacturing the body and the fastener assembly, and b) after one or both of the manufacturing the body and the fastener assembly, and
 the method further includes, prior to the manufacturing the body and the fastener assembly, modeling the body and the body and the fastener assembly to define an outer profile of the tool that matches at least a part of an outer profile of the part to be machined.

19. The method of claim 18, wherein the part to be machined is a turbine disc and the step of modeling the body and the fastener assembly includes selecting a thickness and a diameter defined by the tool to at least approximate a thickness and a diameter, respectively, of the turbine disc.

* * * * *